(12) United States Patent
Wengler et al.

(10) Patent No.: US 8,189,929 B2
(45) Date of Patent: May 29, 2012

(54) METHOD OF REARRANGING A CLUSTER MAP OF VOXELS IN AN IMAGE

(75) Inventors: Mark Christof Wengler, Heidenheim An der Brenz (DE); Alexander Fischer, Eindhoven (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 674 days.

(21) Appl. No.: 12/375,754

(22) PCT Filed: Jul. 30, 2007

(86) PCT No.: PCT/IB2007/052996
§ 371 (c)(1),
(2), (4) Date: Jan. 30, 2009

(87) PCT Pub. No.: WO2008/015625
PCT Pub. Date: Feb. 7, 2008

(65) Prior Publication Data
US 2009/0324073 A1     Dec. 31, 2009

(30) Foreign Application Priority Data
Aug. 2, 2006 (EP) .................................. 06118314

(51) Int. Cl.
G06K 9/62 (2006.01)
G06K 9/00 (2006.01)
(52) U.S. Cl. ...................................... 382/225; 382/154
(58) Field of Classification Search .................. 382/128, 382/154, 168, 225, 199; 345/419–420
See application file for complete search history.

(56) References Cited

U.S. PATENT DOCUMENTS

| | | | |
|---|---|---|---|
| 6,532,017 B1 * | 3/2003 | Knittel et al. | 345/506 |
| 6,584,216 B1 | 6/2003 | Nyul et al. | |
| 6,839,401 B2 * | 1/2005 | Nokita | 378/7 |
| 6,839,462 B1 | 1/2005 | Kitney et al. | |
| 2004/0161073 A1 * | 8/2004 | Nokita | 378/4 |
| 2005/0017972 A1 | 1/2005 | Poole et al. | |

FOREIGN PATENT DOCUMENTS

| | | |
|---|---|---|
| WO | 9828710 A1 | 7/1998 |
| WO | 2006022916 A2 | 3/2006 |

OTHER PUBLICATIONS

Ramoser H et al: "Leukocyte segmentation and classification in blood-smear images" Engineering in Medicine and Biology Society, 2005. IEEE-EMBS 2005. 27th Annual International Conference of the Shanghai, China Sep. 1-4, 2005, Piscataway, NJ, USA, IEEE, Sep. 1, 2005, pp. 3371-3374, XP010908531 ISBN: 978-0-7803-8741-6.

(Continued)

Primary Examiner — Daniel Mariam

(57) ABSTRACT

This invention relates to rearranging a cluster map of voxels in an image aiming at the reduction of sub-cluster scatter. The cluster map that includes two or more cluster levels is displayed to the user along with the distribution of the voxels within each respective cluster levels. The aim is to enable the user to evaluate the quality of the cluster map and based on the evaluation to change the distribution of the voxels. Such a change in the distribution will result in an update of the cluster map.

10 Claims, 4 Drawing Sheets

OTHER PUBLICATIONS

Pena J M et al: "An empirical comparison of four initialization methods for the K-Means algorithm" Pattern Recognition Letters, Elsevier, Amsterdam, NL, vol. 20, No. 10, Oct. 1, 1999, pp. 1027-1040, XP004490735 ISSN: 0167-8655.

Khan S S et al: "Cluster center initialization algorithm for K-means clustering" Pattern Recognition Letters, Elsevier, Amsterdam, NL, vol. 25, No. 11, Aug. 1, 2004, pp. 1293-1302, XP004520638 ISSN: 0167-8655.

Kim et al: "Connectivity-based local adaptive thresholding for carotid artery segmentation using MRA images" Image and Vision Computing, Guildford, GB, vol. 23, No. 14, Dec. 12, 2005, pp. 1277-1287, XP005194814 ISSN: 0262-8856.

Jawahar C V et al: "Investigations on fuzzy thresholding based on fuzzy clustering" Pattern Recognition, Elsevier, GB, vol. 30, No. 10, Oct. 1, 1997, pp. 1605-1613, XP004094246 ISSN: 0031-3203.

A. Tony Agoston, et al; Intensity-modulated Parametric Mapping for Simultaneous Display of Rapid Dynamic and High-Spatial-Resolution Breast MR Imaging Data, Imaging & Therapeutic Technology, vol. 21 • No. 1, Jan.-Feb. 2001, pp. 217-226.

Axel Baune, et al; Dynamical Cluster Analysis of Cortical fMRI Activation, Academic Press, 1999, NeuroImage 9, 477-489 (1999).

Yuichi Kimura; et al; Supervised Clustering Approach to Form Functional Images in Positron Emission Tomography, Proceedings of the 26th Annual International Conference of the IEEE EMBS San Francisco, CA, USA • Sep. 1-5, 2004, pp. 1896-1898.

Lei Xing, et al; Inverse Planning for Functional Image-Guided Intensity-Modulated Radiation Therapy, Phys. Med. Biol. 47, pages 3567-3578, Oct. 3, 2002.

D. L. Pham, et al; Current Methods in Medical Imaging, Image Segmentation, Annu. Rev. Biomed. Eng. 2000, 02: pp. 315-337.

* cited by examiner

METHOD OF REARRANGING A CLUSTER MAP OF VOXELS IN AN IMAGE

FIELD OF THE INVENTION

The present invention relates to a method and a device for evaluating and rearranging a cluster map of voxels in an image.

BACKGROUND OF THE INVENTION

Clustering algorithms allow the grouping of similar regions in an image. Clustering is usually achieved by defining regions, in which neighboring voxels have similar values. These voxels are then combined, forming a cluster, see D. L. Pham et al.: "Current Methods in Medical Imaging", Annu. Rev. Biomed. Eng. 2000. 02:315-37. A cluster map therefore reduces the quasi-continuous values of the original image to a smaller number of levels, forming a cluster map. This is depicted in FIG. 1 showing an example of three cluster levels, cluster level A, B and C. The resulting maps can be displayed alone or overlaid over the original topographic data, see A. T. Agoston et al.: "Intensity-modulated parametric mapping for simultaneous display of rapid dynamic and high-spatial-resolution breast MR imaging data", Imaging and Therapeutic Technology 21, 217, 2001. Cluster maps are used for various applications, one prominent and important example being radio therapy planning (RTP), see L. Xing et al.: "Inverse planning for functional image-guided intensity modulated radiation therapy", Phys. Med. Biol. 47, 3567, 2002.

Achieving a cluster map by a simple and basic clustering algorithm such as K-means algorithm usually results in fragmented clusters marked by the dotted circle in FIG. 1 101, and isolated clusters 102-104.

In applications such as RTP, segmentation and isolation is a major problem. For effective dose planning it is necessary to reduce the number of cluster areas to a minimum, avoiding both segmented and isolated clusters. Several morphological segmentation algorithms exist to achieve this goal, such as "erosion" and "dilation", distance transformation, see Milan Sonka and J. Michael Fitzpatrick: Handbook of Medical Imaging, Volume 2. FIG. 2 shows a "reduced cluster map", resulting from the cluster map in FIG. 1 after appliance of suitable clustering algorithms. FIG. 2 contains only one single cluster level C resulting after merging of fragmented clusters 101 from FIG. 1 into a single cluster, and erasing the isolated clusters.

Various approaches and algorithms exist to accomplish the described reduction of a cluster map, and therefore different results can be achieved. Since such a reduction of the cluster map always results in loss of initial image information, it is important to evaluate the executed modifications. Especially in the medical environment it is crucial to have access to a powerful and yet simple evaluation tool. On one side, therapy planning must not be based on misarranged cluster data, on the other side complicated methods will not find acceptance in a clinical environment.

BRIEF DESCRIPTION OF THE INVENTION

The object of the present invention is to improve prior art cluster reduction methods with regard to sub-cluster scatter by means of providing a method that enables influencing the clustering either manually or automatically.

According to one aspect the present invention relates to a method of rearranging a cluster map of voxels in an image, the cluster map resulting from applying a clustering algorithm on the image, where the cluster map includes at least two cluster levels, the clustering algorithm further being arranged to determine the distribution of the voxels within the cluster map and to determine at least one boundary parameter that separates the distribution into at least two distribution domains, wherein each respective distribution domain reflects the distribution of the voxels of a single cluster level, the method comprising:

providing an input value indicating at least one updated boundary parameter where the boundary parameter indicates an updated population of the distribution domains, and re-calculating the cluster levels in accordance to the updated population of the distribution domains.

By varying the boundary parameter in that way the cluster boundary will also be changed and thereby it is possible to rearrange the cluster map. As an example, if 25% of the voxel distribution belongs to distribution domain A, 45% to distribution domain B and 30% to distribution domain C, and the result of these input values do not result in an acceptable cluster map, new input values can be provided. These input value can e.g. be 30% belonging to A, 40% belonging to B and 30% to C. Based on the updated population, the cluster levels are then re-calculated. This can be considered as an iteration method, since if the updated cluster map is still not acceptable, a new input value can be provided and the updated cluster map will be re-updated until the quality of the cluster map is acceptable.

In an embodiment, the input value is provided by a user after evaluating the cluster map, where the evaluation is based on viewing the cluster map and the distribution of the voxels simultaneously. This enables the user to interactively monitor and influence the clustering and therefore easily evaluate whether the obtained cluster map is acceptable or not.

In an embodiment, the input value is provided automatically after evaluating the cluster map. It follows that the sub-cluster scatter, i.e. the variance of e.g. the sub-cluster centers weighed with their size, will be minimized. This may possible include the morphological (growing/shrinking) operations. Such an automatic process can also be used in a combination with the interactive monitoring of the user.

In an embodiment, the at least two cluster levels and distribution domains are characterized by different color components, wherein the same color component is used for a cluster level and the distribution domain reflecting the distribution of the voxels within the cluster level. Such a visualization allows easy and user friendly evaluation of the achieved clustering.

In one embodiment, the distribution of the voxels within the cluster maps is a histogram.

In another embodiment, the histogram bars further contain color components from the neighboring domains, and thereby voxels from the neighboring domains, such that a partial overlap between adjacent domains is obtained. It follows that a better clustering may be obtained since the histogram will not become as stepwise.

In an embodiment, the applied clustering algorithm is a K-means algorithm, and wherein the updated population of the distribution domains results in updated cluster centers for each respective cluster level. When cluster algorithm such as K-means algorithm is implemented for computing the cluster map, the movement of the boundaries will cause a shift in the cluster center belonging to the clusters. Accordingly, the subsequent rearrangement of the cluster levels may in one embodiment comprise recalculating the cluster map based on the updated cluster centers. Typically, K-means algorithm runs in two steps, the first step being the step of estimating the cluster centers for each cluster level, where the cluster center is the average of all the voxels in the cluster, and the second step being the step where the actual cluster calculation is performed. In this second step the distance to the neighboring voxels is determined and based thereon it is evaluated which voxels belong to the same cluster level. Accordingly, in an embodiment, the step of rearranging the cluster levels in accordance to the updated population of the distribution domains comprises determining an updated cluster map based on the updated cluster centers, i.e. the second step includes an iteration of re-calculating the cluster levels.

According to another aspect, the present invention relates to a computer program product for instructing a processing unit to execute the above method steps when the product is run on a computer.

According to still another aspect, the present invention relates to a device for rearranging a cluster map of voxels in an image, the cluster map resulting from applying a clustering algorithm on the image, where the cluster map includes at least two cluster levels, the clustering algorithm further being arranged to determine the distribution of the voxels within the cluster map and to determine at least one boundary parameter that separates the distribution into at least two distribution domains, wherein each respective distribution domain reflects the distribution of the voxels of a single cluster level, the device comprising:

an input means for receiving an input value indicating at least one updated boundary parameter where the boundary parameter indicates an updated population of the distribution domains, and a processor for re-calculating the cluster levels in accordance to the updated population of the distribution domains.

The aspects of the present invention may each be combined with any of the other aspects. These and other aspects of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 3:
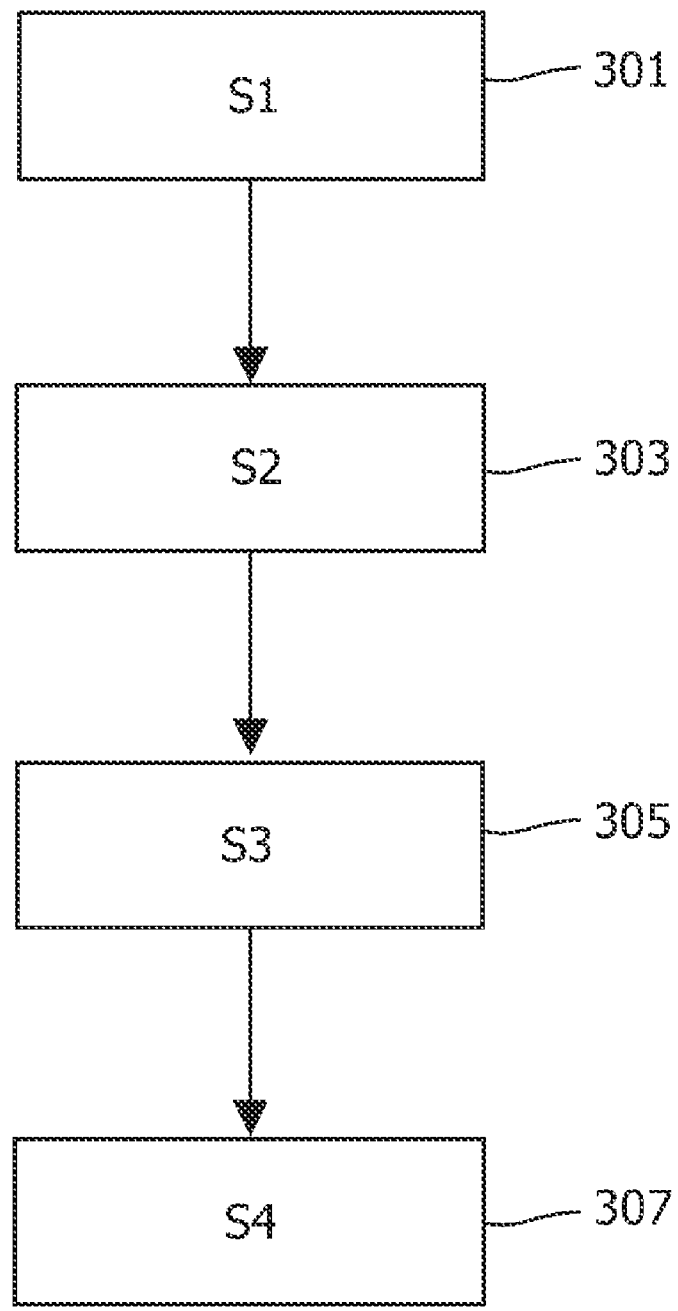
FIG. 3 shows a flowchart illustrating an embodiment of a method according to the present invention.

FIG. 3 shows a flowchart illustrating an embodiment of a method according to the present invention of interactively evaluating and rearranging a cluster map of voxels in an image.

Figure 1:
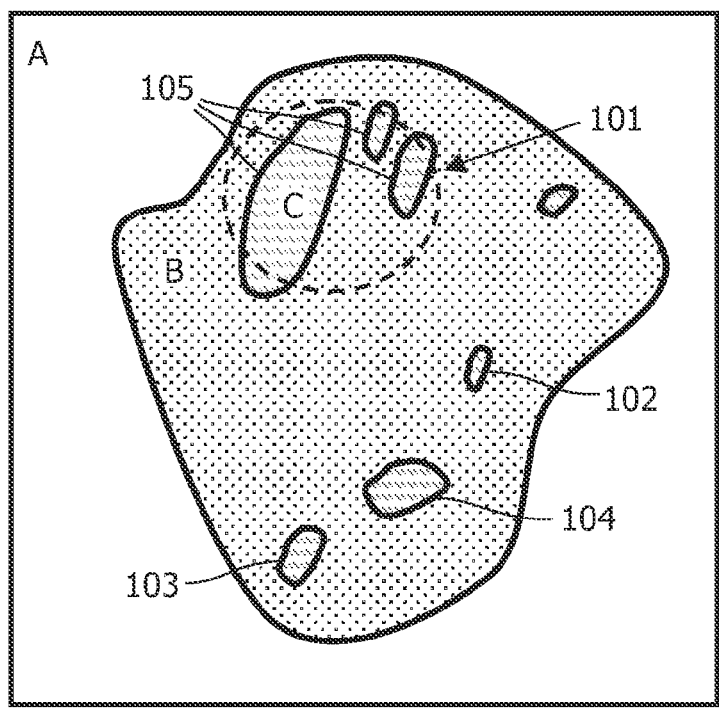
FIG. 1 shows a typical cluster map with three cluster levels.

Such a cluster map is achieved by clustering algorithm such as K-means algorithm, QT Clust algorithm, Fuzzy c-means clustering algorithm, and other types of algorithms that have been reported in the literature, see Milan Sonka and J. Michael Fitzpatrick: Handbook of Medical Imaging, Volume 2. As mentioned previously in the background, achieving a cluster map by such algorithms usually results in fragmented clusters 105 shown within area 101 depicted in FIG. 1, and isolated clusters 102-104. The clusters shown in FIG. 1 are voxels that share some common trait, which typically is based on the proximity, i.e. a pre-defined distance measure. The areas marked as A, B and C are the cluster levels, where each cluster level is assigned to a particular color, e.g. A could be black, B could be blue and C could be red.

As an example, if the K-means algorithm is applied on the image, the computation is divided into two steps. In the first step the voxels in the image are initially scanned and based thereon the centers for each cluster is calculated. In the second step the cluster centers are determined and based on a clustering parameter, in this case a distance parameter, the algorithm assigns each point to the cluster whose center is nearest. The cluster centers are then re computed, i.e. iteration is performed, until some convergence criterion is met. Typically, this is repeated until the assignment hasn't changed.

Figure 2:
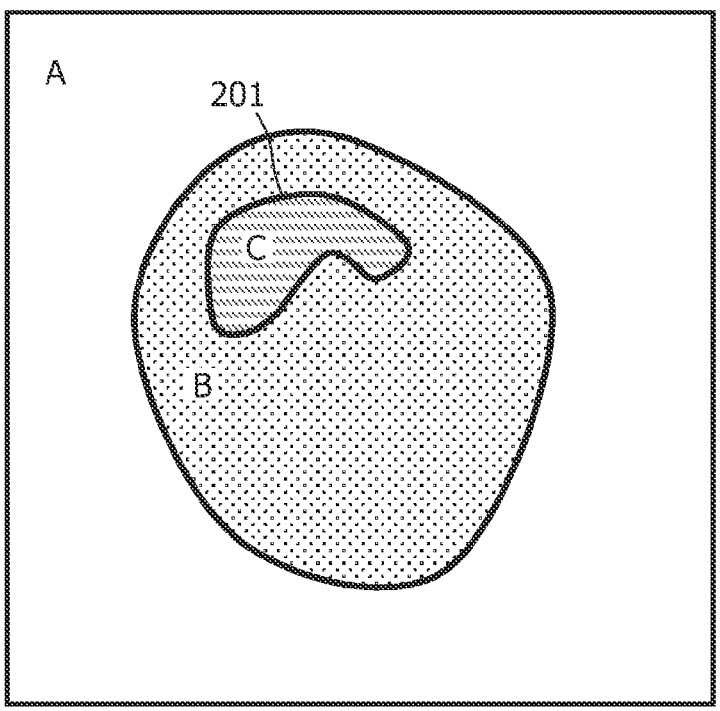
FIG. 2 shows a reduced cluster resulting from FIG. 1.

As mentioned in the background, it is of great importance to reduce the number of cluster areas to a minimum for avoiding both segmented and isolated clusters and to solve this several morphological segmentation algorithms have been developed, as described in Milan Sonka and J. Michael Fitzpatrick: Handbook of Medical Imaging, Volume 2. FIG. 2 illustrates a result achieved by such segmentation algorithms, where only one single cluster level is obtained 201, i.e. the segmented areas 105 belonging to the same cluster level have been combined together into one large cluster level, and the isolated clusters 102-104 have been eliminated.

Referring to the flow chart in FIG. 3, in the first step (S1) 301 the clustering algorithm is applied on the image. If the K-means algorithm is applied, it initially scans all the voxels in the image, determines the cluster centers and assigns each point to the cluster whose center is nearest, then re-computes the centers until the assignment hasn't changed. The result of the computation is accordingly the cluster map (e.g. as shown in FIG. 1) comprising two or more cluster levels. In the following, it will be assumed that the number of cluster levels is three, marked as A, B and C. Also, the result of the computation is a distribution of the voxels within each respective cluster level. An example of such a distribution is e.g. shown in FIG. 4, where the distribution is divided into corresponding distribution domains 401-403 that are separated by boundary parameters 404-405, where each distribution domains illustrated the distribution of the voxels for each respective cluster level. This will be discussed in more details later.

In an embodiment, the resulting cluster map and the distribution of the voxels within the cluster levels are visualized simultaneously. This enables a user, which can e.g. be a technician or a doctor, to evaluate the quality of the clustering (S2) 303. The result of such an evaluation could be that the user sees that the distribution is not reasonable. As an example, the result of the initial distribution could be that 20% of the voxels belong to cluster level A, 55% to cluster level B and 25% to cluster level C.

The user can influence the distribution domains 401-403 by shifting the boundary parameters 404-405 (S3) 305, and thereby affect the population of the voxels in the cluster levels, e.g. to 45% to cluster level B and 35% to cluster level C. This change in the boundary parameters may result in that new cluster centers (in the case a K-means algorithm is applied) are created. Therefore, new cluster centers are calculated and based thereon a new updated cluster mapping is determined (S4) 307.

In an embodiment, the cluster levels and the associated distribution domains 401-403 are displayed in the same color, which makes the evaluation step simpler and more user friendly.

In another embodiment, the quality of the clustering is evaluated automatically by e.g. considering the variance in the clustering, wherein based on the automatic evaluation new boundary parameters or parameters are defined. This is preferable performed as an iteration unit e.g. so that the variance is below a pre-defined threshold value.

Figure 4:
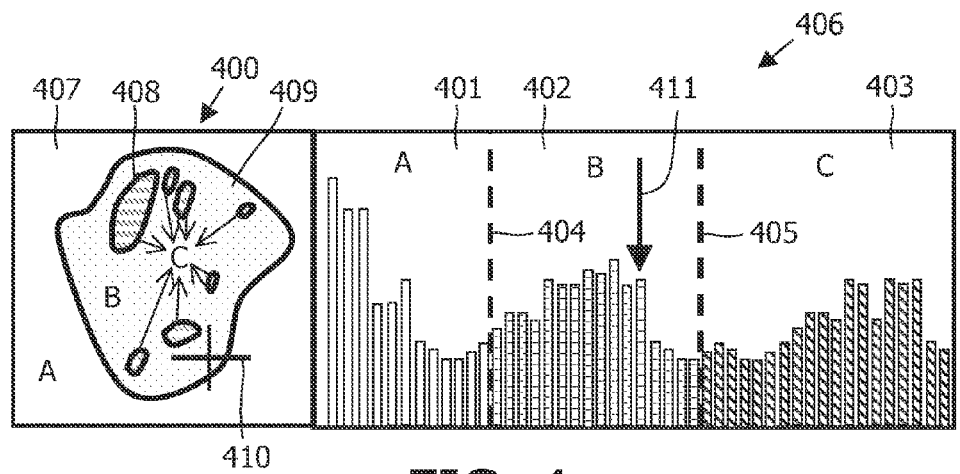
FIGS. 4 and 5 show an example of cluster map and a distribution of voxels.
Figure 5:
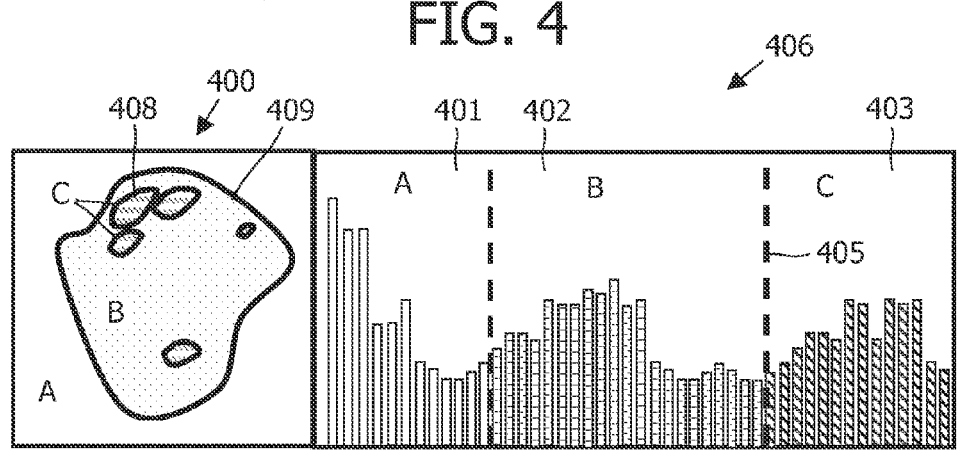

FIGS. 4 and 5 show an example of cluster map 400 and a distribution of the voxels, which in this embodiment is a histogram 406. In an embodiment, the cluster map 400 consists of three cluster levels, cluster level A 407 (that is e.g. associated with a black color), cluster level B 409 (that is e.g. associated with a blue color), and cluster level C 408 (that is e.g. associated with a red color). The histogram 406 shows the distribution for each cluster level, distribution domain 401 shows the distribution of the voxels in cluster level A, distribution domain 402 shows the distribution of the voxels in cluster level B and distribution domain 403 shows the distribution of the voxels in cluster level C. The boundary parameters 404-405 mark the threshold values for the clustering algorithm that is applied. Each histogram bar represents e.g. a certain color information value of the original image and its height indicates the number of voxels belonging to this grey value.

In another embodiment, a cross wire 410 is used to provide a link between the cluster map 400 and the distribution 406 of the voxels within the cluster map 400. Therefore, by moving the cross wire vie e.g. mouse function to cluster level C the arrow 411 will follow and simultaneously point to the histogram bar that has the same color information value.

Accordingly, by e.g. displaying the cluster map and simultaneously the distribution of the voxels for a user, the user can easily evaluate whether the cluster map is acceptable or not. This would typically be based on the experience of the user.

FIG. 5 illustrates a possible effect by moving boundary parameter 405 towards the right, e.g. via mouse click or selecting a new horizontal coordinate value, thereby enhancing the population of the voxels belonging to cluster level B 409 and reducing the population of the voxels belonging to cluster level C 408. Since such a change in population results in a change in a cluster parameter, the cluster map 400 will be re-calculated. As mentioned previously, the change in the population typically results in a change in the cluster level centers in case the K-means cluster algorithm is applied. Therefore, the centers must be re-calculated. In case the cluster level centers are different the cluster levels will inherently change, e.g. in a way as shown in FIG. 5. Accordingly, by moving the boundary parameter 405 in that way, the cluster centers are indirectly re-defined.

Figure 6:
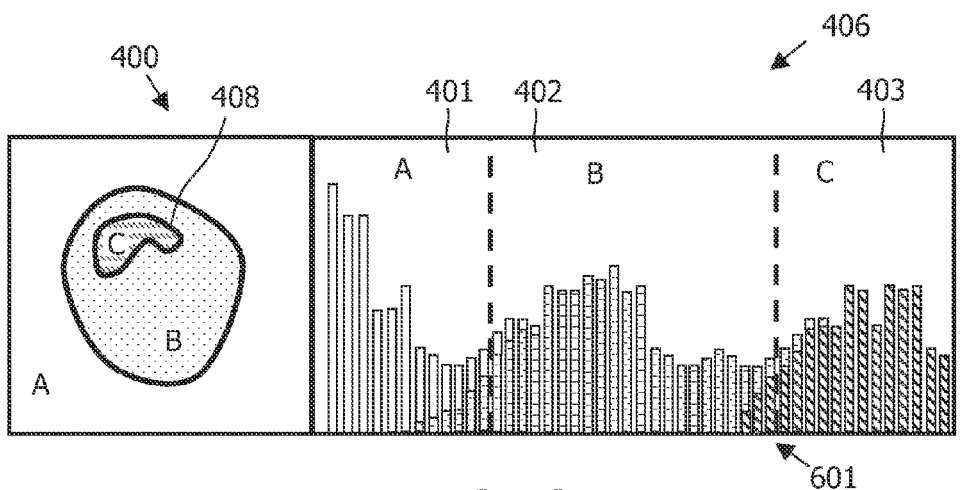
FIG. 6 shows an embodiment of applying a clustering algorithm, where the histogram bars in distribution of the domains can partly overlap.

FIG. 6 shows an embodiment of applying a clustering algorithm where the histogram bars in distribution of the domains 401-403 can partly overlap 601. This means that a single histogram bar e.g. at the boundary between cluster level B 409 and C represent voxels from cluster level B and C, i.e. contains blue and red color. This results in that the boundaries between two adjacent distributions are not as abrupt as shown in FIG. 4. This can result in a better clustering when changing the boundary parameter 405. As shown in FIG. 5 the result of changing the boundary parameters in FIG. 4 could result in a very good clustering where a single cluster level C 408 is formed.

Figure 7:
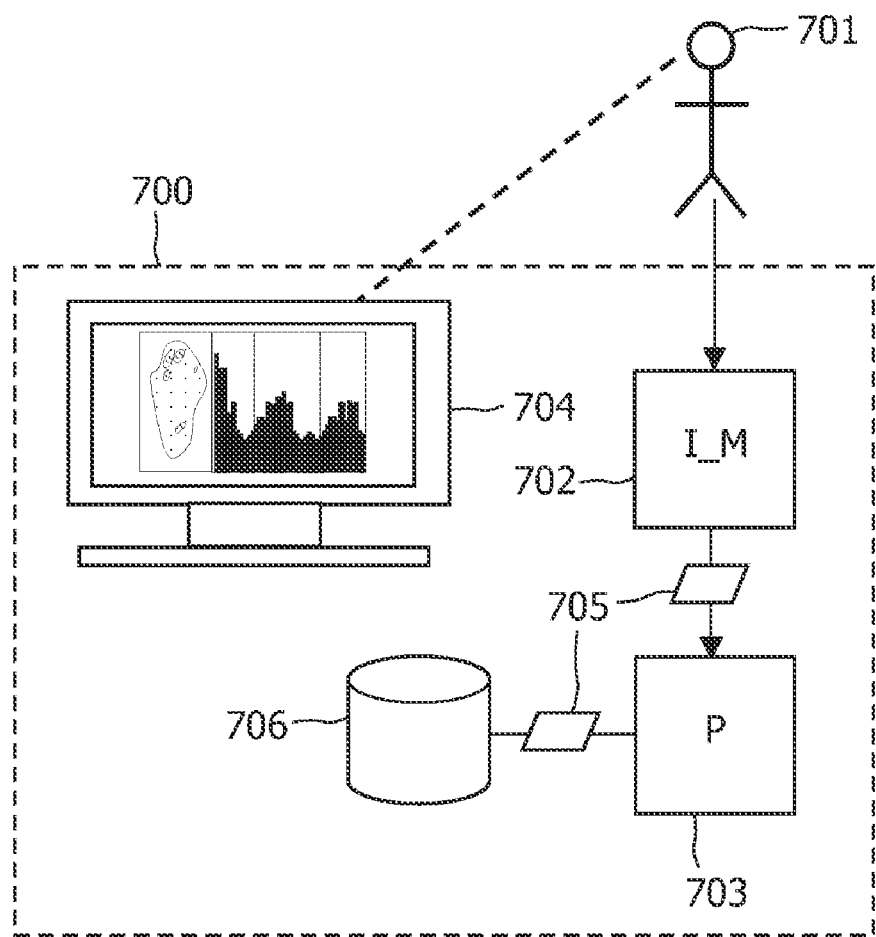
FIG. 7 shows an embodiment of a device according to the present invention for interactively evaluating and rearranging a cluster map of voxels in an image.

FIG. 7 shows an embodiment of a device 700 according to the present invention for interactively evaluating and rearranging a cluster map of voxels in an image, wherein the device 700 comprises a monitor 704, an input means (I_M) 702, a processor (P) 703 and in an embodiment a memory 706. The monitor 704 is adapted to display the cluster map and the distribution of the voxels in the cluster map simultaneously to a user 701. The input means (I_M) 702 is adapted to receive an input from the user indicting an updated boundary parameter. The input means can according comprise a keyboard, a mouse, a speech recognition system, or the like, that enables the user 701 to change the boundaries between the distribution domains (see 404 and 405 in FIG. 4). The received input is then converted into a boundary parameter. As an example, the boundary parameters 404, 405 shown in FIG. 4 could show 35% and 65%, respectively (i.e. <35% belong to cluster level A, <65% belong to cluster level B and >65% to the cluster level C). The user could accordingly change it via a keyboard command to 45% and 60%, or only change one of the boundary parameters. The memory 706 stores the cluster algorithm applied, wherein based on the received boundary parameter 705 the processor (P) 703 notifies the clustering algorithm of the updated boundary parameter 705. The result is that the clustering algorithm is at least partly re-run based on the updated parameter.

In case the boundary parameter(s) are determined automatically, the processor (P) 703 is further adapted to evaluate the quality of the cluster map by e.g. calculate the variance within each respective cluster level and based thereon determine whether a new boundary parameter(s) should be defined.

Certain specific details of the disclosed embodiment are set forth for purposes of explanation rather than limitation, so as to provide a clear and thorough understanding of the present invention. However, it should be understood by those skilled in this art, that the present invention might be practiced in other embodiments that do not conform exactly to the details set forth herein, without departing significantly from the spirit and scope of this disclosure. Further, in this context, and for the purposes of brevity and clarity, detailed descriptions of well-known apparatuses, circuits and methodologies have been omitted so as to avoid unnecessary detail and possible confusion.

Reference signs are included in the claims, however the inclusion of the reference signs is only for clarity reasons and should not be construed as limiting the scope of the claims.

The invention claimed is:

1. A method of rearranging a cluster map (400) of voxels in an image, the cluster map resulting from applying (301) a clustering algorithm on the image, where the cluster map includes at least two cluster levels (407-409), the clustering algorithm further being arranged to determine the distribution of the voxels (406) within the cluster map and to determine at least one boundary parameter (404, 405) that separates the distribution into at least two distribution domains (401-403), wherein each respective distribution domain reflects the distribution of the voxels of a single cluster level (407-409), the method comprising:

providing (305) an input value indicating at least one updated boundary parameter (404, 405) where the boundary parameter indicates an updated population of the distribution domains (401-403), and re-calculating (307) the cluster levels in accordance to the updated population of the distribution domains (401-403).

2. A method according to claim 1, wherein the input value is provided by a user after evaluating (303) the cluster map, where the evaluation is based on viewing the cluster map and the distribution of the voxels simultaneously.

3. A method according to claim 1, wherein the input value is provided automatically after evaluating (303) the cluster map.

4. A method according to claim 1, wherein the at least two cluster levels (407-409) and distribution domains are characterized by different color components, wherein the same color component is used for a cluster level (407) and the distribution domain (401) reflecting the distribution of the voxels within the cluster level (407).

5. A method according to claim 4, wherein the distribution of the voxels within the cluster maps (400) is a histogram (406).

6. A method according to claim 5, wherein the histogram bars further contain color components from the neighboring domains (601), and thereby voxels from the neighboring domains, such that a partial overlap between adjacent domains is obtained.

7. A method according to claim 1, wherein the applied clustering algorithm is K-means algorithm, and wherein the updated population of the distribution domains (401-403) results in updated cluster centers for each respective cluster level.

8. A method according to claim 7, wherein rearranging the cluster levels (407-409) in accordance to the updated population of the distribution domains (401-403) comprises determining an updated cluster map based on the updated cluster centers.

9. A computer program product stored on a non-transitory computer readable medium for instructing a processing unit to execute the method step of claim 1 when the product is run on a computer.

10. A device (700) for rearranging a cluster map (400) of voxels in an image, the cluster map resulting from applying (301) a clustering algorithm on the image, where the cluster map includes at least two cluster levels (407-409), the clustering algorithm further being arranged to determine the distribution of the voxels (406) within the cluster map and to determine at least one boundary parameter (404, 405) that separates the distribution into at least two distribution domains (401-403), wherein each respective distribution domain reflects the distribution of the voxels of a single cluster level (407-409), the device comprising:
    an input means (702) for receiving an input value indicating at least one updated boundary parameter (705) where the boundary parameter indicates an updated population of the distribution domains (401-403), and
    a processor (703) for re-calculating the cluster levels in accordance to the updated population of the distribution domains (401-403).

\* \* \* \* \*